3,288,390
FILM MAGAZINE FOR MOVIE CAMERAS
Masashi Kato, Minamiashigara-machi, Ashigarakami-gun, Japan, assignor to Fuji Shashin Film Kabushiki Kaisha, Kanagawa-ken, Japan, a corporation of Japan
Filed Oct. 26, 1964, Ser. No. 406,275
4 Claims. (Cl. 242—71.2)

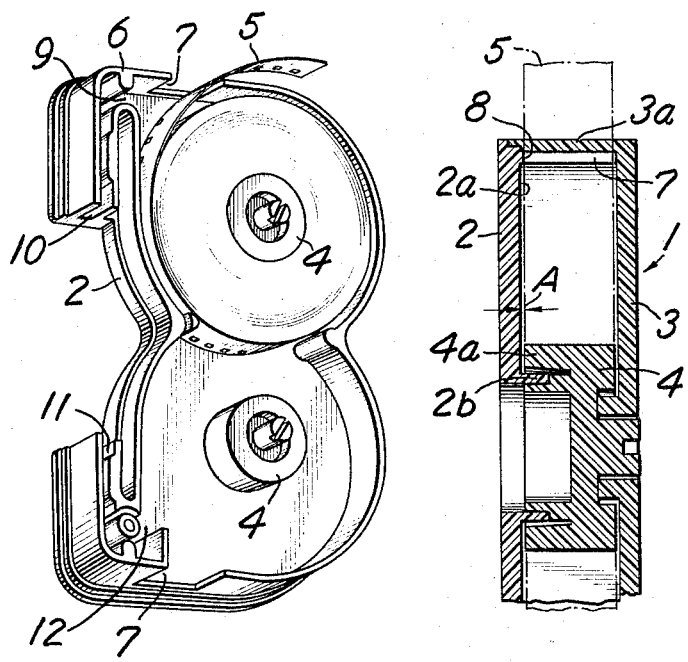

The present invention relates to an improvement in a film magazine (cartridge) for a movie camera, and more particularly to a film magazine in which a portion of the side wall of the housing of the magazine body is cut out to facilitate loading of the film prior to exposure, and withdrawal of the film following exposure.

It is an important object of the present invention to provide a simple and effective means which facilitates film winding in a film magazine and unwinding therefrom.

Another object of the present invention is to provide a means by which a film can be wound uniformly around the film core.

In the present invention, one of the magazine bodies is provided with one or more cut-outs at the side wall to form a film passage, the depth of each cut-out is slightly less than the height of the side wall, thus forming a stepped portion which serves as a guide for introduction of the film.

The present invention is now described as an example with reference to the accompanying drawings, in which:

FIG. 1 is a perspective view of one of the magazine bodies embodying the present invention; and FIG. 2 is an enlarged cross-section of the assembled magazine taken through the cut-out portion.

As shown in the drawings, the magazine 1 comprises a housing 2, and a cover section 3, and two film cores 4 on which a film 5 is wound. The magazine housing 2 has a side wall or flange 6 which is provided with two cut-outs 7. As illustrated in FIG. 2, the depth of each cut-out is slightly less than the height of the flange 6, thus the stepped portion 8 is formed adjacent the inner bottom surface of the housing 2.

The film core 4 is rotatably mounted on the cylindrical boss 2b with a slight clearance A provided between the end surface 4a of the core 4 and the inner bottom surface 2a. The clearance A is substantially the same as the height of the stepped portion 8, and thus, during winding of the film 5, uniform clearance can be maintained between the edge of the film 5 and the inner surface 2a of the body 2, thus the frictional resistance can be substantially reduced, which also prevents electrification.

As the film magazine of the present invention is constructed as described above, the film 5 is introduced through the cut-out 7 and wound around the film core 4, and during this process, the stepped portion 8 serves as a guide, thus film winding and unwinding are facilitated and the film can be wound uniformly around the core 4.

After the film 5 is completely arranged, the body 2 is covered by the cover section 3 and the cut-outs 7 are closed by the side wall 3a of the cover section 3, and the assembled magazine 1 is delivered for service.

It will be appreciated that with the film magazine of the invention, the film is conveyed by conventional means during actual exposure. Thus, during use, film 5 is threaded through opening 9 and aperture 10 past the lens portion of a camera (not shown) and is then re-entrantly threaded through aperture 11 and opening 12 to the take-up chamber illustrated in the lower portion of FIGURE 1. The means by which the film is driven between subsequent exposures is not a part of the invention and may take any of the conventional forms.

What I claim is:

1. A film magazine comprising two separate portions having mating side walls adapted to form a light-tight chamber, apertures in the walls of at least one portion for film passage during use, and a cut-out in the wall of one of said portions having a depth slightly less than the height of said wall, the corresponding wall of the mating portion being left intact to form said light-tight chamber.

2. A film magazine according to claim 1, wherein the chamber formed by said mating portions has an internal height slightly greater than the width of a film strip and the depth of said cut-out is substantially the same as the width of said film strip.

3. A film magazine according to claim 2, wherein said film is mounted upon a film core and the film core is rotatably mounted in said chamber with a clearance being the same as the height of the wall between the bottom of said cut-out and the inner bottom surface of the portion containing said cut-out.

4. A film magazine according to claim 1, wherein said cut-outs are formed at the opposite ends of said chamber.

References Cited by the Examiner
UNITED STATES PATENTS

| 1,561,945 | 11/1925 | Penin | 242—71.2 |
| 1,751,593 | 3/1930 | Merle | 242—71.2 |

FOREIGN PATENTS

| 480,321 | 2/1938 | Great Britain. |

FRANK J. COHEN, *Primary Examiner.*

MERVIN STEIN, N. L. MINTZ, *Assistant Examiners.*